United States Patent [19]

Fobbs

[11] 4,222,450
[45] Sep. 16, 1980

[54] ELECTRICAL DRIVE FOR AUTOMOBILE

[76] Inventor: Hiram Fobbs, 240 State St., Westbury, Long Island, N.Y. 11590

[21] Appl. No.: 895,914

[22] Filed: Apr. 13, 1978

[51] Int. Cl.³ .......................... B60K 1/00; B60K 25/02
[52] U.S. Cl. ................................. 180/65 D; 180/165
[58] Field of Search ................ 180/65 D, 65 A, 65 C, 180/65 B, 65 R, 165; 192/91 A

[56] References Cited

U.S. PATENT DOCUMENTS

| 723,727 | 3/1903 | Pfeil | 180/65 R |
|---|---|---|---|
| 778,133 | 12/1904 | Keates | 180/65 D |
| 1,402,250 | 1/1922 | Pieper | 180/65 A |
| 1,562,903 | 11/1925 | Miller | 180/65 D |
| 2,571,284 | 10/1951 | Nims | 180/65 A |
| 3,374,849 | 3/1968 | Redman | 180/65 DD |
| 3,477,536 | 11/1969 | Carini | 180/65 F |
| 3,499,163 | 3/1970 | Verreault | 180/65 D |
| 3,530,356 | 9/1970 | Aronson | 180/65 R |
| 3,792,742 | 2/1974 | Mager | 180/65 F |
| 3,845,834 | 11/1974 | Petit | 180/65 D |
| 3,861,487 | 1/1975 | Gill | 180/65 R |
| 4,095,665 | 6/1978 | Armfield | 180/65 D |

FOREIGN PATENT DOCUMENTS 341303 6/1936 Italy ........................................ 192/91 A Primary Examiner—David M. Mitchell

[57] ABSTRACT

Electrical apparatus for driving an automobile comprising a DC motor operationally connected to the rear axle through a drive shaft with the motor energized from storage batteries and recharged from alternators coupled to the drive shaft adjacent a clutch at the rear end of the automobile through an auxiliary drive shaft.

3 Claims, 3 Drawing Figures

ELECTRICAL DRIVE FOR AUTOMOBILE

The present invention relates to an electrically propelled automobile and more particularly to a battery charging system for an electric automobile.

Virtually all electric automobiles contemplate the use of DC motors. The DC motor is preferably driven by a conventional storage battery which has a limited capacity after which it is exhausted and must be recharged. The state of charge on the battery will also affect the efficiency and performance of the DC motor. Accordingly, it is desirable to maintain the storage battery as close to a fully charged state as possible. Most prior art systems rely entirely upon the ability to recharge during intermittent periods when the automobile is coasting downhill. Such systems obviously cannot be availed of on flat terrains.

In accordance with the present invention, the batteries are charged from a pair of alternators which are driven from a shaft coupled to the DC motor transmission drive shaft at a predetermined position at the rear axle end of the vehicle where friction losses have been found to be minimum. In addition, the transmission drive shaft and rear axle are coupled together through an hydraulically or pneumatically operated clutch which engages the rear axle at a predetermined voltage upon acceleration and disengages the rear axle at such predetermined voltage during deceleration.

Other advantages of the present invention will become apparent from the following detailed description when read in conjunction with the accompanying drawings of which:

Figure 1:
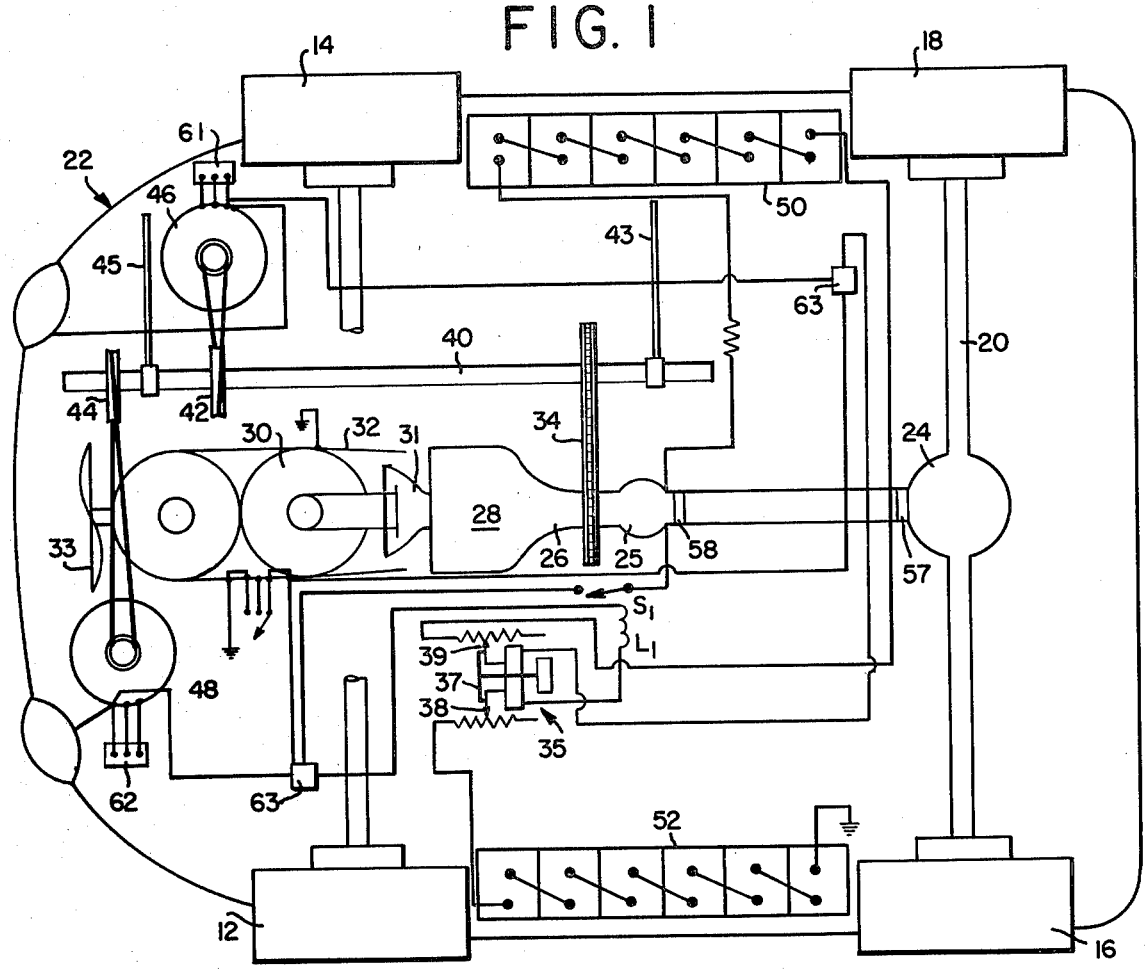
FIG. 1 is a diagrammatic plan view of the electric drive system of the present invention connected in a functional relationship with an automobile chassis.

Referring now to the drawings, the automobile 10 includes front wheels 12 and 14 journaled in a front axle (not shown) and rear traction wheels 16 and 18 journaled in a rear axle 20. The chassis frame 22 of the automobile is supported in a conventional manner on the front axle of the automobile. The automobile is propelled from the rear wheels 16 and 18 by means of the rear axle 20 and rear end differential 24. The rear end differential 24 is connected by a drive shaft 26 through an hydraulically operated clutch 25 to the transmission 28 which may be automatic manual. The transmission 28 is coupled to the DC motor 30 through a torque converter 31 supported within a bell housing 32. The DC motor 30 is a conventional DC motor preferably of the separately excited type. A flywheel (not shown) is attached to the DC motor to provide a coupling to the torque converter 31 of the transmission 28. A fan 33 is also coupled to the front end of the DC motor shaft.

The transmission drive shaft 26 is coupled through a chain drive 34 to a control shaft 40 which lies parallel to the drive shaft 26. The control shaft 40 is journaled in bearings (not shown) supported by struts 43 and 45 connected to the chassis frame 22. Pulley members 42 and 44 are keyed to the control shaft 40 at the front end of the automobile 10. A pair of alternators 46 and 48 are driven by the pulley members 42 and 44 through belts 46 and 48 respectively.

The chassis frame 22 supports a primary bank of storage batteries 50 and 52 at each side of the car and, possibly, a secondary bank of storage batteries (not shown). The primary batteries 50 and 52 supply energy to the DC motor 30 for electrically operating the automobile 10. The batteries 50 and 52 are connected in a circuit arrangement with the DC motor 30 through the accelerator control 35. A parallel circuit connection is preferred although for increased energy a series parallel arrangement may be used. For simplicity the wiring connections are made through electrical junction boxes 63.

Figure 2:
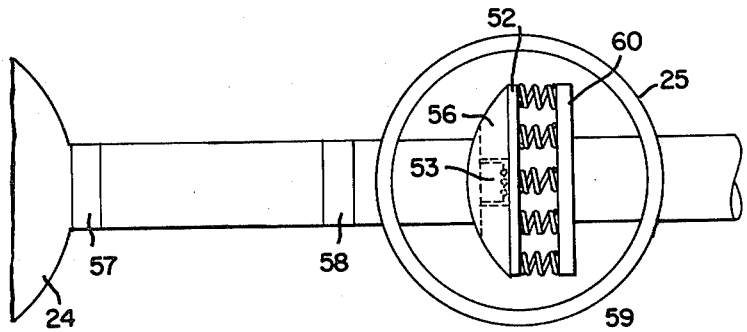
FIG. 2 is a diagrammatic showing of the hydraulically or pneumatically controlled clutch of FIG. 1 in an engaged position.
Figure 3:
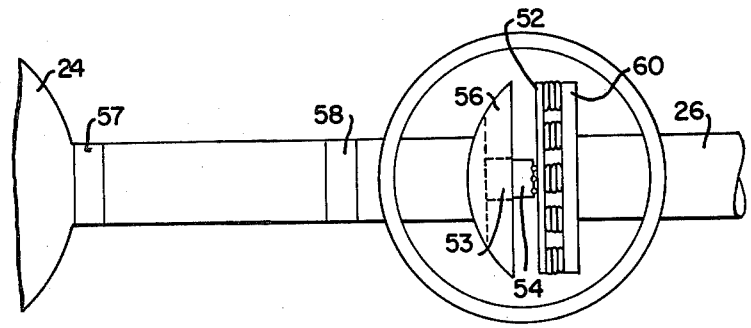
FIG. 3 is a diagrammatic showing of the clutch of FIG. 2 in the disengaged position.

The hydraulically operated clutch 25 is activated by the accelerator control 35 under the direct operation of the driver of the automobile. A slidable clutch plate 52, as is more clearly shown in FIGS. 2 and 3, abuts an hydraulically operated cylinder and piston assembly 53. The assembly 13 is activated in a conventional manner through a solenoid (not shown). The piston 54 is preferably fitted with ballbearings 55 at the interface engaging the clutch plate 52. The clutch plate 52 is held engaged to a conventional clutch disk 56 by means of springs 59 which extend from a plate 60 secured to the drive shaft 26. The clutch disk 56 is secured to a rear end drive member coupled through front and rear universal joints 58 and 57 to the rear end differential 24. When the piston 53 is actuated it extends from the cylindrical housing 54 disengaging the clutch plate 52 from the clutch disk 56. When the clutch 25 is disengaged the rear end differential is released and the rear wheels are no longer driven by the motors 30.

The clutch 25 is actuated from the accelerator control 35. The accelerator control 35 is controlled from the accelerator foot pedal 37 which is connected to a pair of wiper arms 38 and 39 of potentiometers R1 and R2. The pressure on the foot pedal (accelerator) varies the current flow through the inductance coil L1. When the current is high the contact S1 will be opened, the cylinder 53 unactuated and the clutch engaged. Alternatively, when the current is low, which may represent complete foot pedal release, contact S1 is closed because of an insufficient electromagnetic field generated by inductance coil L1 which actuates cylinder 53 disengaging the clutch. Accordingly, the clutch may be engaged and disengaged at any pedal pressure representing any desired predetermined speed such as 5 mils per hour.

During operation the chain drive 34 rotates shaft 40 which drives the alternators 46 and 48 through belt drives 42 and 44 respectively. The alternators 46 and 48 recharge the batteries 50 and 52. Voltage regulators 61 and 62 are set to cause recharging at any given drop in battery voltage. A third battery (not shown) may be connected in circuit with the alternators through a relay contact responsive to the clutch control circuit or any predetermined voltage to assist recharging.

The alternators 46 and 48 recharge the batteries 50 and 52 during operation of the automobile regardless of terrain with one battery actually supplementing the weaker battery.

What is claimed is:

1. Apparatus for electrically driving an automobile comprising: a DC motor, a transmission coupled to said DC motor and being operatively connected to a set of rear wheels; a drive shaft extending from said motor, a rear end differential operatively connected to a set of rear wheels, clutch means for coupling said rear end differential to said drive shaft, at least two storage batteries, an accelerator control circuit including means for varying the current flow from said batteries to said motor and means of activating said clutch means to disengage said rear end differential below a predetermined minimum acceleration and battery charging means comprising; an auxiliary shaft aligned in parallel with said drive shaft, means for coupling said auxiliary shaft to said drive shaft at a location between said clutch and said transmission such that said auxiliary shaft rotates in concert with said drive shaft and at least two alternators coupled to said auxiliary shaft and to said batteries for supplying recharging current during controlled periods of time when the rear wheels are disengaged.

2. Apparatus as defined in claim 1 wherein said accelerator control circuit comprises an acceleration pedal, potentiometer means connected to said batteries, means coupling said pedal to said potentiometers and means responsive to a predetermined pedal position for actuating said clutch means.

3. Apparatus as defined in claim 1 wherein said means for coupling said auxiliary shaft to said drive shaft is a chain drive and wherein said clutch means comprises a laterally slidable clutch plate, a clutch disk operatively coupled to said rear end differential and means for disengaging said clutch plate and clutch disk in response to a predetermined position of said acceleration pedal.

* * * * *